(12) United States Patent
Engelhardt

(10) Patent No.: US 11,086,639 B2
(45) Date of Patent: Aug. 10, 2021

(54) METHOD FOR PROCESSING A USER INPUT AND MOTOR VEHICLE HAVING A DATA-PROCESSING DEVICE

(71) Applicant: AUDI AG, Ingolstadt (DE)

(72) Inventor: Doreen Engelhardt, Ingolstadt (DE)

(73) Assignee: Audi AG, Ingolstadt (DE)

(*) Notice: Subject to any disclaimer, the term of this patent is extended or adjusted under 35 U.S.C. 154(b) by 126 days.

(21) Appl. No.: 16/342,478

(22) PCT Filed: Oct. 17, 2017

(86) PCT No.: PCT/EP2017/076510
§ 371 (c)(1),
(2) Date: Apr. 16, 2019

(87) PCT Pub. No.: WO2018/082917
PCT Pub. Date: May 11, 2018

(65) Prior Publication Data
US 2020/0026534 A1 Jan. 23, 2020

(30) Foreign Application Priority Data

Nov. 2, 2016 (DE) .......................... 102016221466.7

(51) Int. Cl.
*G06F 3/048* (2013.01)
*H04M 1/2746* (2020.01)
(Continued)

(52) U.S. Cl.
CPC ............ *G06F 9/451* (2018.02); *G06F 3/0482* (2013.01); *G06F 3/167* (2013.01); *G06F 7/08* (2013.01);
(Continued)

(58) Field of Classification Search
None
See application file for complete search history.

(56) References Cited

U.S. PATENT DOCUMENTS 7,039,629 B1 5/2006 Theimer et al.
8,073,845 B2 12/2011 Homma et al.
(Continued)

FOREIGN PATENT DOCUMENTS

CN 1685303 A 10/2005
CN 101471979 A 7/2009
(Continued)

OTHER PUBLICATIONS

International Preliminary Report on Patentability directed to related International Patent Application No. PCT/EP2017/076510, dated May 7, 2019, with attached English language translation; 11 pages.
(Continued)

*Primary Examiner* — Xuyang Xia
(74) *Attorney, Agent, or Firm* — Sterne, Kessler, Goldstein & Fox P.L.L.C.

(57) ABSTRACT

The disclosure relates to a method for processing a user input in a vehicle, in which a suitable subset is selected based on a result of an evaluation of the user input from a superset of personal data records. For each data record of the subset, a frequency value is then determined corresponding to a respective frequency of use. The subset is output to the user adapted to the frequency values. In order to offer a particularly efficient operability, it is provided that the superset is retrieved from a mobile terminal and stored in a memory device of the vehicle before the subset is selected. For adapting the output to the user, the determined frequency values of the data records of the subset are checked for a predetermined selection criterion, at the fulfillment of which the data record with the highest frequency value is determined as a VIP data record and marked and/or preselected upon an output to the user.

15 Claims, 1 Drawing Sheet

(51) Int. Cl.
  *G06F 9/451* (2018.01)
  *G06F 16/245* (2019.01)
  *G06F 3/0482* (2013.01)
  *G06F 3/16* (2006.01)
  *G06F 7/08* (2006.01)
  *H04M 1/60* (2006.01)

(52) U.S. Cl.
  CPC ........ *G06F 16/245* (2019.01); *H04M 1/6091* (2013.01); *G06F 3/048* (2013.01); *H04M 1/2746* (2020.01); *H04M 2250/60* (2013.01); *H04M 2250/64* (2013.01)

(56) References Cited

U.S. PATENT DOCUMENTS

| | | | |
|---|---|---|---|
| 9,979,807 | B2 | 5/2018 | Konnerth et al. |
| 2006/0128438 | A1 | 6/2006 | Balle et al. |
| 2007/0263843 | A1* | 11/2007 | Foxenland .......... H04M 1/2746 379/355.02 |
| 2010/0241963 | A1* | 9/2010 | Kulis .................... G06F 16/685 715/727 |
| 2011/0276330 | A1* | 11/2011 | Charlier .............. H04M 1/2757 704/246 |
| 2012/0110473 | A1* | 5/2012 | Tseng ................ H04M 1/72427 715/753 |
| 2013/0117294 | A1* | 5/2013 | Arao ................... H04L 63/1425 707/758 |
| 2013/0275871 | A1* | 10/2013 | Helm ................... G11B 27/105 715/716 |
| 2014/0173515 | A1* | 6/2014 | Efrati ................... G06Q 10/109 715/811 |
| 2016/0070437 | A1* | 3/2016 | Chiang ............... G06F 3/04817 715/846 |
| 2017/0060264 | A1* | 3/2017 | Gasselin de Richebourg ............ G06F 3/03547 |

FOREIGN PATENT DOCUMENTS

| | | |
|---|---|---|
| CN | 103167171 A | 6/2013 |
| CN | 106534446 A | 3/2017 |
| DE | 19933524 A1 | 1/2001 |
| DE | 10042983 A1 | 3/2002 |
| DE | 102008021954 A1 | 9/2009 |
| DE | 102009010275 A1 | 9/2009 |
| DE | 102010026708 A1 | 1/2012 |
| DE | 102014010305 A1 | 1/2016 |
| EP | 2453438 A1 | 5/2012 |
| KR | 20060026586 A | 3/2006 |

OTHER PUBLICATIONS

Chinese Application No. 201780067661.8, Office Action dated Jun. 3, 2020; attached English Translation from EPO Global Dossier, 11 pages.

International Search Report and Written Opinion of the International Searching Authority directed to related International Patent Application No. PCT/EP2017/076510, dated Feb. 27, 2018, with attached English-language translation; 15 pages.

* cited by examiner

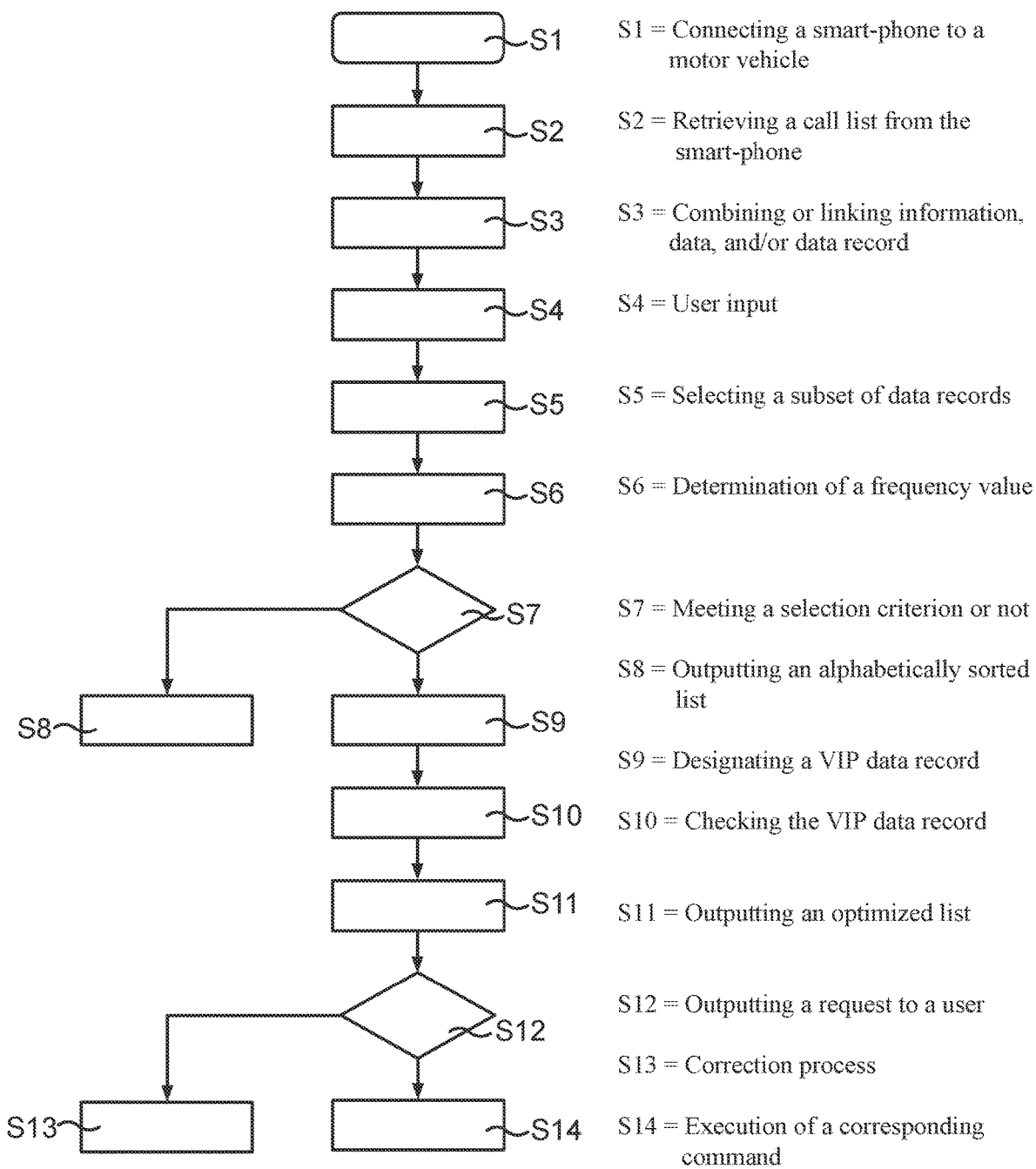

METHOD FOR PROCESSING A USER INPUT AND MOTOR VEHICLE HAVING A DATA-PROCESSING DEVICE

TECHNICAL FIELD

The present application relates to a method for processing a user input and a motor vehicle.

BACKGROUND

From DE 199 33 524 A1 a method for inputting data into a system is known wherein terms that match as precisely as possible are determined upon an input of a user, a reliability value is determined for each of these terms and, taking into account their reliability values, the terms assigned to an input are further treated. The probability value describes a probability of reusing a data record and corresponds to the ratio of the number of uses of this data record relative to the total number of uses of all data records. If several terms are recognized, it is provided that an announcement/display sequence for the data records is determined as a function of their probability values and the reliability value of the associated term. The recognized terms or found data records may be announced and/or displayed for confirmation or selection. Overall, an input of data is to be facilitated for the user.

DE 10 2010 026 708 A1 discloses a voice dialog system and a method for operating a voice dialog system. In the method, it is provided that voice inputs are compared with entries of data records stored in a database. In a first comparison, a second voice input is compared with the entries of the data records or a first subset of the data records is identified. In a second comparison, a previously stored first voice input is compared with the subset of the data records, and, depending on this second comparison, a number of hits is determined from the subset. When determining the number of hits, a match measure or confidence measure may be defined, with the number of hits comprising the data record or the data records with the highest match rate. The hit(s) may be displayed in a display area. A previously selected subset may be confirmed by a second voice input and in recurring operations on the voice dialog system may be used advantageously in the subsets selected in the past.

DE 10 2009 010 275 A1 describes an information obtaining apparatus, an information obtaining system and an information obtaining method. The information obtaining apparatus comprises an input unit for inputting characters, a database for storing names and attribute words connected thereto, and a degree of relevance, which in each case concerns the degree of relevance between a name and an attribute word. The names may be read out and output as candidate names. It is also possible to output the attribute words extracted from the candidate names. The degree of relevance of a candidate name is determined in terms of a combination of extracted attribute words. Further, a degree of independence indicative of the degree of difference between the extracted attribute words and a degree of coverage indicating the extent to which the combination covers the candidate names are calculated. A likewise calculated degree of equality indicates the uniformity of a number of candidate names for each attribute word. Finally, a score for the combination of attribute words is calculated and the combinations of the attribute words are output to the output unit as the magnitude of the scores decreases. As the degree of relevance is updated, a frequency of selecting a POI name (Point of Interest) by the user may be taken into account.

US 2011/0 276 330 A1 describes a method for supplementing an address list and for determining a communication profile. An address list may be downloaded from another device. This address list may be combined with a stored communication address to form a common address list. Upon a user input, a first contact may be issued from the combined address list. With appropriate sorting, this may be, for example, the contact most frequently called.

From US 2014/0 173 515 A1 a method for identifying and displaying a set of prioritized contacts is known. Therein, according to one embodiment, a particular contact may be identified as a prioritized contact if an absolute call frequency for that particular contact is greater than a fixed value X.

DE 10 2014 010 305 A1 describes an administration of a call journal. From its journal entries, list entries may be derived, which in turn may be provided in a display list. The order of the list entries may be determined by different criteria. One possible criterion here is a respective previous frequency of establishing contact with a specific communication partner that is assigned to a specific journal entry. Also, for example, depending on a current time, a current location, or current environmental information for a particular contact, a probability may be calculated that a call to or from a particular communication device will be initiated or received. This probability may also be used for sorting the contacts.

BRIEF DESCRIPTION OF THE DRAWINGS

FIG. 1 schematically shows an exemplary flowchart of a method for processing a user input in a motor vehicle.

DETAILED DESCRIPTION

The present application relates to a method for processing a user input and a motor vehicle.

From DE 199 33 524 A1 a method for inputting data into a system is known wherein terms that match as precisely as possible are determined upon an input of a user, a reliability value is determined for each of these terms and, taking into account their reliability values, the terms assigned to an input are further treated. The probability value describes a probability of reusing a data record and corresponds to the ratio of the number of uses of this data record relative to the total number of uses of all data records. If several terms are recognized, it is provided that an announcement/display sequence for the data records is determined as a function of their probability values and the reliability value of the associated term. The recognized terms or found data records may be announced and/or displayed for confirmation or selection. Overall, an input of data is to be facilitated for the user.

DE 10 2010 026 708 A1 discloses a voice dialog system and a method for operating a voice dialog system. In the method, it is provided that voice inputs are compared with entries of data records stored in a database. In a first comparison, a second voice input is compared with the entries of the data records or a first subset of the data records is identified. In a second comparison, a previously stored first voice input is compared with the subset of the data records, and, depending on this second comparison, a number of hits is determined from the subset. When determining the number of hits, a match measure or confidence measure may be defined, with the number of hits comprising the data record or the data records with the highest match rate. The hit(s) may be displayed in a display area. A previously selected subset may be confirmed by a second voice input and in recurring operations on the voice dialog system may be used advantageously in the subsets selected in the past.

DE 10 2009 010 275 A1 describes an information obtaining apparatus, an information obtaining system and an information obtaining method. The information obtaining apparatus comprises an input unit for inputting characters, a database for storing names and attribute words connected thereto, and a degree of relevance, which in each case concerns the degree of relevance between a name and an attribute word. The names may be read out and output as candidate names. It is also possible to output the attribute words extracted from the candidate names. The degree of relevance of a candidate name is determined in terms of a combination of extracted attribute words. Further, a degree of independence indicative of the degree of difference between the extracted attribute words and a degree of coverage indicating the extent to which the combination covers the candidate names are calculated. A likewise calculated degree of equality indicates the uniformity of a number of candidate names for each attribute word. Finally, a score for the combination of attribute words is calculated and the combinations of the attribute words are output to the output unit as the magnitude of the scores decreases. As the degree of relevance is updated, a frequency of selecting a POI name (Point of Interest) by the user may be taken into account.

US 2011/0 276 330 A1 describes a method for supplementing an address list and for determining a communication profile. An address list may be downloaded from another device. This address list may be combined with a stored communication address to form a common address list. Upon a user input, a first contact may be issued from the combined address list. With appropriate sorting, this may be, for example, the contact most frequently called.

From US 2014/0 173 515 A1 a method for identifying and displaying a set of prioritized contacts is known. Therein, according to one embodiment, a particular contact may be identified as a prioritized contact if an absolute call frequency for that particular contact is greater than a fixed value X.

DE 10 2014 010 305 A1 describes an administration of a call journal. From its journal entries, list entries may be derived, which in turn may be provided in a display list. The order of the list entries may be determined by different criteria. One possible criterion here is a respective previous frequency of establishing contact with a specific communication partner that is assigned to a specific journal entry. Also, for example, depending on a current time, a current location, or current environmental information for a particular contact, a probability may be calculated that a call to or from a particular communication device will be initiated or received. This probability may also be used for sorting the contacts.

The object of the present application is to provide a method and a motor vehicle which offer a particularly efficient operability.

Further features, details and embodiments of the invention are set forth in the following description.

In the method according to the application for processing a user input, an evaluation of the user input is carried out by means of a data processing device of a vehicle and, based on a result of the evaluation from a superset of personal data records, a subset suitable for the user input is selected.

Furthermore, a frequency value which corresponds to a number of previous uses of the data record is determined for each data record of the subset by means of the data processing device. Subsequently, by means of an output device of the vehicle, the subset of data records is output to the user adapted to the determined frequency values. The adaptation of the subset of data records to the determined frequency values may also be performed by the data processing device and may include, for example, determining an output and/or display sequence for the data records of the subset.

In order to provide a particularly efficient operability, it is provided according to the application that the superset of data records is retrieved before the subset is selected by a mobile terminal other than the vehicle and is stored in a memory device of the vehicle. To adjust the output to the user, the determined frequency values of the data records of the subset are checked against a predetermined selection criterion. If the selection criterion is met, the data record having the highest frequency value from the subset is designated as a VIP data record and marked and/or preselected upon an output to the user. A data record related to an organization or a company, for example, may also be understood in this context to be a personal data record. In any case, the data records may in particular include or contain a telephone number or a contact or contacting number, which may be associated in particular with a name and/or a term. The user input may then be, for example, a command to contact a particular person, organization, or institution identified by the particular name or term. In particular, the user input may be or include a voice input, that is, a spoken instruction or spoken keyword. Alternatively or additionally, however, other operator actions, such as, for example, a manual actuation of a control element, may also be provided or carried out as user input or as part of the user input.

The use of the data record by the user may be understood as an active use, that is to say, a user-initiated use or utilization of the data record or of a part of the data record. Likewise, however, a passive use of the data record or of a part of the data record by the user may also be understood or meant here. A passive use may be initiated, for example, by a third party. For example, for an incoming call or arriving contact request or message from a person or organization or the like, particularly if the calling person or organization is associated with a data record or is assigned to the call. In this case, an interaction and in particular a timely interaction on the part of the user is not absolutely necessary in order to generate or count a use of the data record. For example, a call that is missed or received in the absence of the user may be considered a use of the corresponding data record.

For example, the number of uses of a data record may be counted discretely and increased by a predetermined unit, for example, by one for each use or use instance. It may also be possible to provide an automated mechanism or an automated function, by which the number of uses is limited to a predetermined time frame falling prior to the current point in time. In other words, uses that are older than a predetermined period of time, for example, may be ignored or disregarded when determining the frequency value. It is also possible to provide or take into account weighting factors in the determination of the frequency value, whereby a relevance of the subset of data records ultimately output to the user may be improved. Such weighting factors may include, for example, an age of use, a current position of the user, a particular usage pattern, or the like.

The subset of data records may be selected from the superset, for example, corresponding to a result of voice recognition of the user input. When the subset is output to the user, it may be provided that only one piece of information or only certain information of the respective data record, i.e. not the complete data record, is output to the user. Likewise, both the superset and the subset of the data records or the respective individual data records may be supplemented by further information, for example from a further database. Accordingly, it may thus be possible that a datum finally output to the user or information finally output to the user had become part of the respective data record only through a corresponding addition or link to other data or data records and originally was not directly or explicitly included in the superset retrieved from the mobile terminal or in the respective data record retrieved from the mobile terminal. For example, the superset retrieved from the mobile terminal may be a call list, with the telephone numbers contained therein only being subsequently linked, for example by comparison with a database, such as an address book, with respective names or terms assigned to the individual telephone numbers. It may therefore be provided that the superset of data records retrieved from the mobile terminal is integrated into a database stored in the vehicle.

Since a VIP data record is only selected when the selection criterion is met, it is by implication therefore possible—even if the subset contains one or more data records—that no VIP record is designated or selected. This may be the case, for example, if all the data records of the subset have the same frequency value and/or if no data record significantly distinguishes or differentiates itself from the other data records with respect to one examined criterion or one evaluated property. However, it is possible, if the subset includes only a single data record, that this one data record will in each case be designated as a VIP record.

A marking of the VIP data record should be suitable for making this clear or recognizable to the user, in particular with the least possible effort, compared to the remaining subset. This may be done, for example, by a color marking, by a specially highlighted position or arrangement, by an additional graphic element or symbol, by a modified representation or the like, but also, for example, by an acoustic marking. Additionally or alternatively, it may also be possible to generate an individual haptic feedback on a corresponding control element provided for selecting a data record when the VIP data record is selected.

A preselection of the VIP data record may mean or cause an actual, final selection of the data record or a confirmation of the preselection, by which the preselected VIP data record is interpreted as corresponding to the user request, to be possible with a minimum or reduced number of further operations or interactions. In particular, it may be provided that only a single operator action, such as a single keystroke or a single voice command, is provided or is sufficient to confirm the preselection. However, it is also possible that after a predetermined period of time, even without further operator action or interaction of the user, the preselected VIP data record is automatically interpreted as corresponding to the user request and also used or further processed accordingly.

Overall, the method may be consulted and used to improve recognition, interpretation and processing of the user input, since the superset of data records retrieved from the mobile terminal may be brought in and used as an additional—advantageously particularly up-to-date—input variable or database. Thus, a particularly efficient operability may be achieved, since, for example, a number of operator actions, queries, selection steps and/or confirmations may be reduced, because a preselection corresponding to the particular user request may automatically be made with higher probability and reliability. This is advantageously accompanied by an increase in safety during operation of the vehicle, since the method according to the application minimizes distraction, in particular visual distraction, and/or mental strain on the user in the execution of the user input and for achieving an implementation of his desired operation. Particularly advantageously, the method according to the application may be used for a voice dialog system in the vehicle, during the operation of which the user may allow his view to be directed at the surrounding traffic while interacting with the voice dialog system, that is to say during the user input.

The retrieval of the superset of data records from the mobile terminal may, for example, be automated and/or initiated by the user via a, preferably wireless, data connection between the mobile terminal and the vehicle or the data processing device of the vehicle. Preferably, a Bluetooth protocol may be used for this purpose.

In the method according to the application, it is provided that the selection criterion is whether a relative value is greater than a predefined threshold value, wherein the relative value is formed by a ratio of the highest frequency value to the second highest frequency value or by a ratio of the highest frequency value to a sum of all frequency values of the data records of the subset. In other words, it is therefore checked whether a relative frequency of use of a particular data record is significantly distinguished or differentiated from the relative frequency of use in the remaining data records. In a concrete implementation, an equivalent criterion, such as whether a relative value is smaller than a correspondingly adapted predetermined threshold, may of course also be checked. By using the selection criterion, it may be advantageously ensured that the user is presented with a specific data record as a VIP data record only if the latter actually has a significantly outstanding frequency of use. Thus, for example, it may be prevented that the user initially has to first cancel or correct a preselection that does not correspond to his wishes in an individual case when there is a correspondingly high probability of using at least approximately the same number of data records. As a result, an irritation of the user may advantageously be avoided and/or a degree of frustration with the user input may be minimized.

In a further embodiment of the method according to the application, it is provided that, after the determination of the VIP data record by means of the output device, a voice request is issued to the user for querying whether the desired data record has been marked and/or preselected. In particular it is provided that a specific feature identifying the selected VIP data record, such as a name or a term, is specified with the voice request. This advantageously enables the user to achieve further processing or implementation of his user input with minimal operator input. Particularly advantageously, the user then does not necessarily have to control the output subset of data records. The voice request may also name an action requested or ordered with the original user input, so that the user may advantageously ensure without additional checking that the desired action or type of action has been understood and/or performed.

Preferably, after the determination of the VIP data record, if more than one telephone number, contact number or contact information item is linked to this, a respective frequency of use may be determined for all telephone numbers, contact numbers or contact information items that are linked to the VIP data record. The voice request for confirming the marking and/or preselection then additionally queries whether the telephone number, contact number or contact information item with the greatest frequency of use is to be used in a processing or further processing or implementation of the user input. As a result, an additional selection step or an additional user input may advantageously be avoided, thus minimizing a time necessary for the implementation or execution of the intention of the original user input, and therefore increasing overall an efficiency in the processing of the user input. Instead of the actual telephone number, the name of the telephone number, for example "mobile number" or "landline" or "landline number," may preferably be queried with the voice request. This advantageously provides the user with improved and easier understanding of the voice request, so that the user may make a decision to confirm or reject the voice request with greater reliability and with less mental processing effort.

In a further embodiment of the method according to the application, it is provided that the subset of data records is output as a list, the VIP data record being output as the first list element and the other data records of the subset subsequently being sorted alphabetically. This makes it particularly advantageous on the one hand to identify the VIP data record very easily and quickly and on the other hand, especially if the VIP data record does not correspond to the desired data record, to locate the actual desired data record particularly easily, quickly and reliably. It is particularly advantageous that the alphabetical sorting of the other data records is time-invariant, so that, for example, even with changing relative frequency of use of the data records, the user is always confronted with a familiar list or list order. By contrast, when the entire subset of data records is sorted based on relative usage frequencies, the order of the data records may always be different, making it difficult for the user to find a particular data record.

In a further embodiment of the method according to the application, it is provided that a call list containing information on outgoing and/or incoming calls is used as a superset of data records. Incoming calls may be answered or accepted calls as well as missed or unanswered calls. Outgoing calls may also include calls that resulted in a successful connection and calls that did not lead to a successful connection. Thus, a complete interaction history of the user with the corresponding data record, for example with a specific contact from an address book, may be taken into account particularly advantageously. This may be particularly advantageous, for example, if the user would like to call a contact or a person, which in previous contact instances, that is, for example, in previous calls and thus in previous uses of the corresponding data record, usually initiated or prompted the contact or call. By using or consulting the contact data, in particular the corresponding frequency of use, from the mobile terminal of the user it is advantageously possible to have recourse to an enlarged database, so that the determination of the VIP record is made with greater or improved reliability and accuracy, because it is not just the statistics of uses of the data records in the vehicle or with facilities or devices of the vehicle that are consulted, used or evaluated.

The mobile terminal may be, for example, a mobile phone (smartphone), a messenger, a computer (laptop, tablet) or the like. It is also possible to retrieve corresponding data records or supersets of data records from several mobile terminals simultaneously or one after the other and to combine the respective data records or supersets and/or to store and/or evaluate them in an additive or complementary manner in a single database or in a database application. Likewise, retrieval of the superset or a superset of data records from a server device (provider, cloud), for example via the Internet, may be provided. Also, different types of data records or supersets of data records may be retrieved and evaluated in terms of a number of uses or interactions of a particular data record or with a particular data record, that is, for example, a number of interactions or contacts with a particular person. In addition to a call list, this may include, for example, a message list or a message history in which, for example, incoming and/or outgoing text messages (SMS) and/or messenger messages and/or e-mails are listed or tracked. As a result, advantageously, a reliability and accuracy of the determination of the VIP data record may be further increased or improved, so that the correct data record, that is, the one actually desired by the user, is more likely to be designated as a VIP data record.

In a further embodiment of the method according to the application, it is provided that the superset of data records is retrieved only once during or after each connection of the mobile terminal to the vehicle. In particular and preferably, this one-time retrieval may be done automatically. Advantageously, it is thus not necessary to re-establish a connection with the mobile terminal for each user input or during each user input, whereby a processing speed of the user input may be increased and a load of the mobile terminal may be reduced. For example, an unnecessary load on the battery of the mobile terminal can be avoided. Likewise, if appropriate, advantageously provided data processing steps of the data retrieved from the mobile terminal need to be performed only once after each connection of the mobile terminal to the vehicle, whereupon time and computing and/or data processing effort on the part of the vehicle may also advantageously be saved. Preferably, the superset of data records may take place immediately after each connection of the mobile terminal to the vehicle and, thus, in particular before the user input. This advantageously guarantees as delay-free and fast processing of user input as possible. Advantageously, after the data has been retrieved once from the mobile terminal and stored, for example, in a memory device of the vehicle, this data may also be accessed at later times, in particular even if the mobile terminal has been switched off after the connection and the retrieval of the data.

A motor vehicle according to the application comprises a data processing device and an output device connected to the data processing device via or by means of a data connection for outputting information, notifications or the like to a user. The user may in particular be a vehicle occupant. In order to provide the most efficient operability, it is provided according to the application that the motor vehicle has a data interface for connecting the motor vehicle to a mobile terminal, via which or by means of which data are or may be exchanged between the data processing device and the mobile terminal. In this case, the motor vehicle also has a data memory or a data storage device with a program code that may be executed by the data processing device and that is configured to execute at least one embodiment of the method according to the application when the program code is executed by the data processing device.

In a further embodiment of the motor vehicle according to the application, it is provided that the motor vehicle has an input device configured to detect the user input, which comprises a microphone device for detecting acoustic voice inputs of the user and which is connected to the data processing device via a data connection. Thus, voice input or voice commands of the user of the data processing device may therefore be supplied or provided or transmitted.

In a further embodiment of the motor vehicle according to the application, it is provided that the output device has on the one hand a display surface for visual information presentation, that is, a display or the like, and on the other hand a speaker device for acoustic information output and/or a data interface for transmitting output data to a speaker device or the like. In other words, the subset of data records, and in particular the VIP data record, may, for example, be visually perceptible to the user. For this purpose, a display and/or a head-up display arranged, for example, in an instrument panel of the motor vehicle may be used. The loudspeaker device may preferably serve for the acoustic output of voice requests to the user, which may include, for example, a request or a prompt to confirm the preselection of the VIP data record. For this purpose, instead of a loudspeaker device or a loudspeaker system of the motor vehicle, a corresponding data stream may also be transmitted via the data interface to, for example, a headset. It may also be possible, for example, to use the mobile terminal itself for visual or optical and/or audible information output to the user.

The details, features and embodiments of the method according to the application and of the motor vehicle according to the application indicated heretofore, hereinafter and in the claims, and the corresponding advantages are correspondingly interchangeable or transferable mutatis mutandis between the method according to the application and the motor vehicle according to the application. This also applies to components or devices that are used or are usable for carrying out the method according to the application.

Further features, details and advantages will become apparent from the following description of a preferred embodiment and from the drawing. The single FIGURE ("FIG. 1") shows an exemplary schematic flowchart of an embodiment of the method according to the application.

The single FIGURE schematically shows an exemplary flowchart of a method for processing a user input in a motor vehicle. In a method step S1, the method is started, for example, by connecting a smartphone of a user to the motor vehicle via a Bluetooth data connection. Subsequently, in a method step S2, a call list is retrieved from the smartphone by a data processing device of the motor vehicle, which call list contains information on selected or made outgoing calls, information on incoming accepted calls and information on incoming missed or unanswered calls. This call list thus represents a superset of data records. A single data record may in particular correspond to or be assigned to a contact person, that is to say, for example, a person or organization, wherein all incoming and outgoing calls and calls not resulting in a successful connection and the corresponding telephone numbers are assigned to this person and thus this data record. If no contact partner, that is, for example, no person or no name or no identifying term is assigned or may be assigned to a particular telephone number which is contained in the call list, this telephone number may also form or represent a standalone data record or be treated as such. In addition, further information, data or data records may be retrieved from the smartphone. This may include, for example, an address book or an address and/or name database or a contact database. Advantageously, time stamps associated with the individual calls of the call list may also be retrieved with or as part of the call list.

All information, data and/or data records retrieved from the smartphone are then linked or combined in a method step S3 with a database of the motor vehicle or integrated into this database of the motor vehicle. The database of the motor vehicle may be stored or deposited in a memory device of the motor vehicle. The database of the motor vehicle may therefore be supplemented, for example, with the information retrieved from the smartphone, and/or the database of the motor vehicle may be updated with this information so that the database of the motor vehicle as a whole is up-to-date. The database of the motor vehicle may also be or include, for example, an address book or a contact database.

At any subsequent point in time, a user input takes place in a method step S4. This is preferably a voice input or a voice command, which is detected by a corresponding detection device of the motor vehicle, which may comprise a microphone, for example, and is transmitted to the data processing device of the motor vehicle. For example, in the present case, the voice input may be: "Call Peter." This voice input is processed and evaluated by means of the data processing device in the context of an automated voice recognition. Based on a result of the voice recognition, a subset of data records available in the database of the motor vehicle, in this case of suitable contact partners, which is suitable for the recognized user input, is selected in a method step S5. For example, this subset may therefore include all contact partners having the first name "Peter."

In today's voice recognition systems, typically in response to such a voice input or such an operation process, any contact or contact person with the name "Peter" present in a corresponding database, for example in the address book of the motor vehicle, is displayed for the user as a list, which is typically sorted completely alphabetically. An example of such a conventional alphabetically sorted list is:
1. Peter Arnold
2. Peter Bauer
3. Peter Eckardt
4. Peter Mueller In this case, the user is disadvantageously shown all contacts that are purely due to the voice recognition or speech evaluation, even though not all contacts are equally relevant, so that the contact actually desired or intended by the user may also be far down the list, where applicable, and, depending on the available display device or display space, for example, it may initially not even be visible at all. As a result, the user has to deal intensively with the displayed list in order to find, identify and select the desired or intended contact.

In order to provide or to achieve an improved and more efficient processing of the user input and thus also an operability of the motor vehicle, a determination of a respective frequency value, which corresponds to a number of previous uses of each data record, takes place in a method step S6 following the selection of the subset for this data record of the subset. The subset of data records may therefore be analyzed with regard to the respective frequency of use of the individual data records and then, for example, a list, rank list or ranking list sorted according to the frequencies, frequency of use or frequency values may be set up.

The frequency values thus determined or the ranked list thus established are then evaluated in a method step S7 with regard to a selection criterion. In the present case, the question as to whether a relative value is greater than a predefined threshold value or limit value serves as a selection criterion. In this case, the relative value is formed as the ratio of the highest determined frequency value to the second-highest frequency value, wherein a sum of all frequency values of the data records of the partial quantity may also be taken into account or included or incorporated into the evaluation of the selection criterion. For example, the situation may occur that the most frequently used data record, that is, the data record with the highest frequency value, has been used 20 times so far. For example, the corresponding contact partner may have been called 20 times. If, for example, there are one or more further data records of the subset which have been used 19 times, for example, then the respective differences of frequency of use or frequency values are not to be regarded as significant and the relative value of 20 to 19 or approximately 1.053 may be smaller than the predetermined threshold value. In this case, therefore, the selection criterion is not met, and accordingly, in a method step S8 for example, the subset of data records may be output as an alphabetically sorted list according to the known procedure. However, it is also possible in this case, for example, to identify the most frequently used data record.

If, instead, the situation is that the most frequently used data record has been used 20 times, but the second most frequently used data record has been used for example only 5 times or only 10 times, then the difference in frequency of use is to be regarded as significant or to be assessed. Accordingly, the predetermined threshold value may be selected such that the relative value of 20 to 5 or 20 to 10, that is to say 5 or 2, is greater than the predetermined threshold value. Consequently, in this case, the selection criterion is met, and in a method step S9, the most frequently used data record, that is, the data record with the highest frequency value, is designated as a VIP data record.

In the event that the analysis of the frequency of use of the telephone numbers does not yield a VIP data record as a result, it may also be possible to evaluate or analyze another or several other parameters or properties of the respective data records. This may include, for example, an evaluation of a frequency of use or communication via other communication means or channels, such as e-mail. Nevertheless, a VIP data record may be determined, if appropriate, from this additional selection by a corresponding adapted selection criterion.

Alternatively, it may also be provided that, for example, immediately after method step S3, the entire database, that is to say the entirety of all data records, is analyzed according to their frequency of use. In this case, the respective frequency values would already be known after or with the selection of the subset of the data records suitable for user input. It is also possible, for example, immediately after the method step S3—i.e. in particular even before the user input—to determine the respective frequency values of all data records and to determine a VIP data record for several different subsets in a more elaborate or complex assignment. For example, all data records which contain a specific term or have a specific feature may be combined to form a subset which is then evaluated or analyzed in the manner described for determining the respective VIP data record of this subset. It may also be possible for a single data record to occur in a plurality of subsets constructed or created according to different criteria. In this way, a required data processing and time expense may advantageously be minimized after the user input. For example, all data records which have the same first name may each be subdivided into a subset. That is, a first subset may include, for example, all contact partners named "Peter" and a second subset, for example, all contact partners named "Thomas". Whether a contact partner with the name "Peter" was determined or classified as VIP record or VIP contact in advance, that is, before the user input, may then be checked very quickly and easily after the voice recognition for the user input was performed, for example.

After the determination of the VIP data record, a check is made in a method step S10 whether the VIP data record contains a plurality of telephone numbers or if a plurality of telephone numbers are assigned to the corresponding contact partner or if several telephone numbers are linked to the VIP data record or the corresponding contact partner. If this is the case, the most frequently used telephone number is determined. It may also be possible, if there are a plurality of telephone numbers, to carry out an analysis or evaluation for this that corresponds to or is analogous to the method step S7 based on a corresponding selection criterion, with which one or more telephone numbers, as applicable, may be determined as the preferred telephone numbers or VIP phone numbers. For the present example, it is to be assumed that, for example, a mobile number of the VIP data record is the telephone number used most frequently for communication with the contact partner assigned to or corresponding to the VIP data record.

After the determination of the VIP data record, the subset of the data records which are suitable for the user input is output in the form of an optimized list in a method step S11. In this optimized list, the VIP data record is all the way at the top, that is to say, it is arranged as the first element or list element, in particular highlighted or marked and preselected. The remaining data records of the subset are subsequently sorted or arranged in alphabetical order in the VIP data record:

*Peter Mueller*
2. Peter Arnold
3. Peter Bauer
4. Peter Eckardt

Simultaneously or subsequently, in a method step S12, an acoustic voice request or confirmation request is output to the user by means of a loudspeaker device. Such a voice request may be generated automatically, for example, by a voice dialog system of the motor vehicle and may be, for example: "Do you want to call Peter Mueller on the mobile number?"

It may also be provided that only the frequencies of use of the plurality of telephone numbers contained in the VIP data record are analyzed for outgoing calls for the voice or confirmation request, so that it is queried with the voice request, whether the telephone number so far most frequently used to contact the VIP contact—thus, in this case Peter Mueller, is to be called. It is also possible to take into account further parameters, such as a current time and/or respective times of the individual uses or instances of use of the different telephone numbers assigned to the VIP contact. Thus, advantageously, the most probable or useful telephone number at a given time may be determined. For example, during normal business hours, a call on a business telephone number or a telephone number of an office, and outside normal business hours a call on a home telephone number may be suggested or requested. Thus, it may also be possible to determine the database of the motor vehicle or another source of information for determining, for example, the usual business hours depending on a probable location or an address of the VIP contact.

Alternatively, the voice request may be, for example: "Do you mean Peter Mueller?" This may be provided, for example, if the VIP data record contains only one telephone number or if the analysis of the frequencies of use of the multiple telephone numbers has not been performed or has not yielded a significantly most frequently used telephone number as the result.

The method may also be used if, for example, the user says a full name during his initial user input. Such a user input may in the present example be something like: "Call Peter Mueller." Here, for example, in the case of a recognition, a plurality of possible hits or matches in the context of voice recognition of the VIP data record may be particularly emphasized from or with respect to this group or subset of names or data records. Thus, regardless of the specific type of user input, it is possible to prioritize a specific data record—in particular the data record determined as a VIP record—in the further processing of the user input.

It may also be possible for there to be several data records which include the same complete name. For example, two data records may be present, in each of which the name of the corresponding contact is "Peter Mueller." In this case too, one of these data records may advantageously be determined as a VIP data record by taking into account and evaluating the frequency values.

If the voice or confirmation request is rejected by the user or answered negatively, a correction process may be initiated in a method step S13 or, for example, the method may be aborted. Here it is possible, for example, to jump back to an earlier method step, to carry out a new voice recognition of the user input adjusted in consideration of the negative answer, or to request further information or restrictions from the user or the like.

On the other hand, if the voice or confirmation request is confirmed, answered in the affirmative or receives a positive response, the execution of the corresponding command or the corresponding action requested with the original user input may be initiated in a method step S14.

If the user subsequently carries out another user input, wherein the smartphone has not been disconnected between the two user inputs and has been reconnected to the motor vehicle, the method may now be run again, for example, beginning with method step S4.

The invention claimed is:

1. A method for processing a user input from a user for a motor vehicle, comprising:
    retrieving, by a data processing device, a superset of data records from a mobile terminal other than the motor vehicle;
    storing, by a memory device, the superset of data records;
    evaluating, by the data processing device, the user input to provide a result;
    selecting, by the data processing device, a subset of data records based on the user input from the superset of data records based on the result;
    determining, by the data processing device, a frequency value for each data record of the subset of data records, the frequency value corresponding to a respective number of previous uses of each data record, as adjusted by a weighting factor, wherein the weighting factor includes a current position of the user;
    outputting, by an output device, the subset of data records based on the frequency values to the user;
    determining, by the output device, a particular frequency value of a particular data record of the subset of data records having a highest value among the frequency values of all the data records of the subset of data records;
    determining, by the output device, the particular frequency value of the particular data record that meets a predetermined selection criterion, wherein the predetermined selection criterion is whether a relative value is greater than a predefined threshold value, wherein the relative value is:
        a ratio of the particular frequency value to a second highest frequency value among the frequency values of all the subset of data records, or
        a ratio of the particular frequency value to a sum of all frequency values of the subset of data records;
    designating, by the output device, the particular data record as a VIP data record, wherein the VIP data record includes a plurality of telephone numbers;
    preselecting, by the output device, the VIP data record;
    marking, by the output device, the VIP data record;
    determining, by the output device, a location of a telephone number out of the plurality of telephone numbers;
    determining, by the output device, available hours of the telephone number based on the location;
    determining, by the output device, that a current time is within the available hours; and
    outputting, by the output device, the VIP data record and the telephone number to the user.

2. The method according to claim 1, wherein the superset of data records includes a call log containing information on selected or made outgoing calls, information on incoming accepted calls and information on incoming missed or unanswered calls.

3. The method according to claim 1, wherein the superset of data records is retrieved only once during or after each connection between the mobile terminal to the motor vehicle.

4. The method according to claim 1, further comprising:
    issuing, by the output device, a voice request to the user to query the preselecting and the marking the VIP data record.

5. The method according to claim 4, further comprising:
    determining, by the output device, a respective frequency of use for each telephone number associated with the VIP data record; and
    outputting, by the output device, the voice request with an additional query as to whether the telephone number with a greatest respective frequency of use is to be used in processing of the user input.

6. The method according to claim 1, wherein outputting of the subset of data records further comprises:
    outputting, by the output device, the subset of data records as a list;
    outputting, by the output device, the VIP data record as a first item of the list; and
    outputting, by the output device, a remaining subset of data records being sorted alphabetically.

7. A motor vehicle comprising:
a data processing device configured to:
    retrieve a superset of data records from a mobile terminal other than the motor vehicle;
    evaluate a user input from a user to provide a result;
    select a subset of data records based on the user input from the superset of data records based on the result;
    determine a frequency value for each data record of the subset of data records, the frequency value corresponding to a respective number of previous uses of each data record, as adjusted by a weighting factor, wherein the weighting factor includes a current position of the user;
    determine a particular frequency value of a particular data record of the subset of data records having a highest value among the frequency values of all the data records of the subset of data records;
    determine whether the particular frequency value of the particular data record meets a predetermined selection criterion, wherein the predetermined selection criterion is whether a relative value is greater than a predefined threshold value, wherein the relative value is:
  a ratio of the particular frequency value to a second highest frequency value among the frequency values of all the subset of data records, or
  a ratio of the particular frequency value to a sum of all frequency values of the subset of data records;
an output device configured to:
  output the subset of data records based on the frequency values to the user;
  designate the particular data record as a VIP data record, wherein the VIP data record includes a plurality of telephone numbers;
  preselect the VIP data record;
  mark the VIP data record;
  determine, by the output device, a location of a telephone number out of the plurality of telephone numbers;
  determine, by the output device, available hours of the telephone number based on the location;
  determine, by the output device, that a current time is within the available hours; and
  output the VIP data record and the telephone number to the user;
a data interface configured to:
  connect the motor vehicle and the mobile terminal; and
  exchange data between the data processing device and the mobile terminal; and
a memory device configured to:
  store the superset of data records; and
  store a program code executable by the data processing device.

8. The motor vehicle according to claim 7, further comprising:
  an input device configured to detect the user input.

9. The motor vehicle according to claim 8, wherein the input device further comprises:
  a microphone device configured to detect acoustic voice inputs of the user.

10. The motor vehicle according to claim 9, wherein the microphone device is connected to the data processing device via a data connection.

11. The motor vehicle according to claim 7, wherein the output device further comprises:
  a display area configured to present visual information;
  a speaker device configured to output acoustic information; and
  a second data interface configured to transmit an output data to the speaker device.

12. The method according to claim 1, wherein the weighting factor accounts for a respective age of each of the previous uses.

13. The method according to claim 1, wherein the previous uses are within a predetermined time frame falling prior to a current point in time.

14. The motor vehicle according to claim 7, wherein the weighting factor accounts for a respective age of each of the previous uses.

15. The motor vehicle according to claim 7, wherein the previous uses are within a predetermined time frame falling prior to a current point in time.

* * * * *